(12) United States Patent
Yasuda

(10) Patent No.: US 9,869,910 B2
(45) Date of Patent: Jan. 16, 2018

(54) LIQUID CRYSTAL DISPLAY DEVICE

(71) Applicant: Mitsubishi Electric Corporation, Tokyo (JP)

(72) Inventor: Shohei Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 121 days.

(21) Appl. No.: 15/079,839

(22) Filed: Mar. 24, 2016

(65) Prior Publication Data

US 2016/0291379 A1 Oct. 6, 2016

(30) Foreign Application Priority Data

Apr. 6, 2015 (JP) ................... 2015-077357

(51) Int. Cl.
*G02F 1/1345* (2006.01)
*G09G 3/36* (2006.01)

(52) U.S. Cl.
CPC ......... *G02F 1/1345* (2013.01); *G09G 3/3614* (2013.01)

(58) Field of Classification Search
None
See application file for complete search history.

(56) References Cited

U.S. PATENT DOCUMENTS

| | | | | |
|---|---|---|---|---|
| 5,818,114 A * | 10/1998 | Pendse | ................... | H01L 24/05 257/203 |
| 6,107,578 A * | 8/2000 | Hashim | ................. | H05K 1/0228 174/250 |
| 8,305,318 B2 | 11/2012 | Ishiguchi | | |
| 2007/0030409 A1 * | 2/2007 | Aoki | ..................... | G02F 1/1345 349/56 |
| 2012/0019121 A1 * | 1/2012 | Teng | ..................... | G02F 1/1345 313/306 |
| 2012/0127412 A1 * | 5/2012 | Lee | ........................ | G02F 1/1345 349/139 |
| 2014/0022148 A1 * | 1/2014 | Kim | ....................... | G09G 5/003 345/55 |
| 2015/0219944 A1 * | 8/2015 | Mitsumoto | ........... | G02F 1/1339 349/138 |
| 2016/0255719 A1 * | 9/2016 | Song | .................... | H05K 1/0296 174/254 |
| 2017/0075158 A1 * | 3/2017 | Wang | .................. | G02F 1/13452 |

FOREIGN PATENT DOCUMENTS

| | | | |
|---|---|---|---|
| JP | H10-209589 A | | 8/1998 |
| JP | 2006-171387 | * | 6/2006 |
| JP | 2006-171387 A | | 6/2006 |

* cited by examiner

*Primary Examiner* — Ryan Crockett
(74) *Attorney, Agent, or Firm* — Studebaker & Brackett PC

(57) ABSTRACT

A liquid crystal display device includes a display region, a plurality of lead-out lines led from the display region, and an application circuit that applies a voltage to liquid crystal in the display region through each of the lead-out lines. Each of the lead-out lines has a tilt portion wired with a directional component parallel to a peripheral direction enclosing the display region in a plan view, and when a difference between a voltage applied to one of the lead-out lines and a voltage applied to another one of the lead-out lines is specified as an applied voltage difference, each of the lead-out lines is wired such that, in a plan view, the taper portion of one of the lead-out lines is overlapped with the taper portion of another one of the lead-out lines having the applied voltage difference lower than a difference with adjacent one of the lead-out lines.

5 Claims, 12 Drawing Sheets

F I G. 6
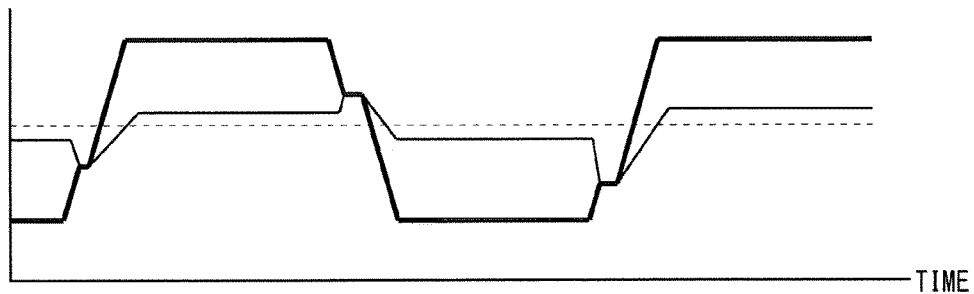
F I G. 7
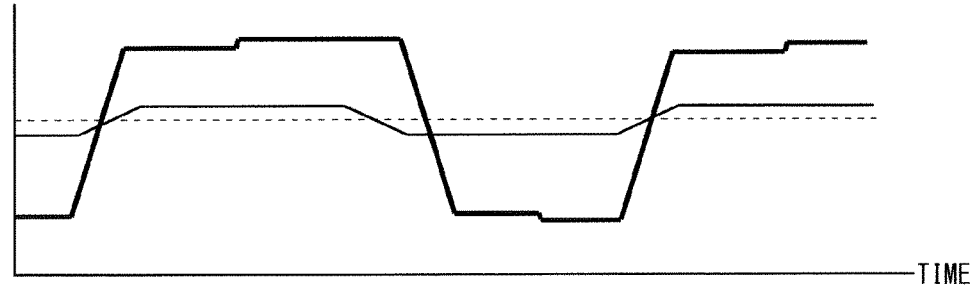
F I G. 8
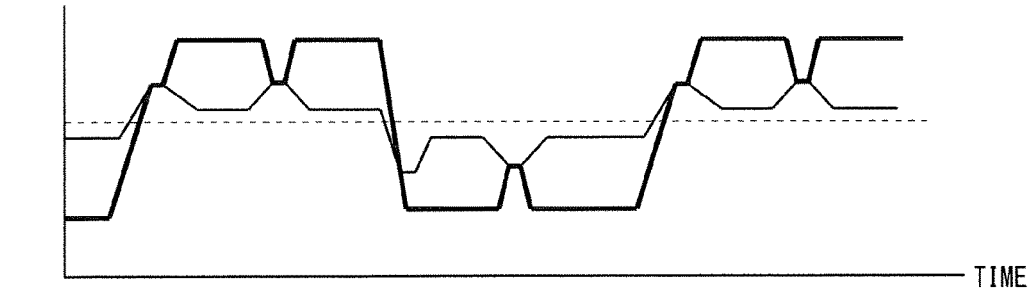

FIG. 18 n FRAME

FIG. 19 n+1 FRAME

FIG. 20 n FRAME

FIG. 21

| - | - | - | - | - | - | - | - | - |
|---|---|---|---|---|---|---|---|---|
| + | + | + | + | + | + | + | + | + |
| - | - | - | - | - | - | - | - | - |
| + | + | + | + | + | + | + | + | + |
| - | - | - | - | - | - | - | - | - |
| + | + | + | + | + | + | + | + | + |
| - | - | - | - | - | - | - | - | - |
| + | + | + | + | + | + | + | + | + | n+1 FRAME

FIG. 22

| + | - | + | - | + | - | + | - | + |
|---|---|---|---|---|---|---|---|---|
| - | + | - | + | - | + | - | + | - |
| + | - | + | - | + | - | + | - | + |
| - | + | - | + | - | + | - | + | - |
| + | - | + | - | + | - | + | - | + |
| - | + | - | + | - | + | - | + | - |
| + | - | + | - | + | - | + | - | + |
| - | + | - | + | - | + | - | + | - | n FRAME

FIG. 23

| - | + | - | + | - | + | - | + | - |
|---|---|---|---|---|---|---|---|---|
| + | - | + | - | + | - | + | - | + |
| - | + | - | + | - | + | - | + | - |
| + | - | + | - | + | - | + | - | + |
| - | + | - | + | - | + | - | + | - |
| + | - | + | - | + | - | + | - | + |
| - | + | - | + | - | + | - | + | - |
| + | - | + | - | + | - | + | - | + | n+1 FRAME

F I G . 2 4
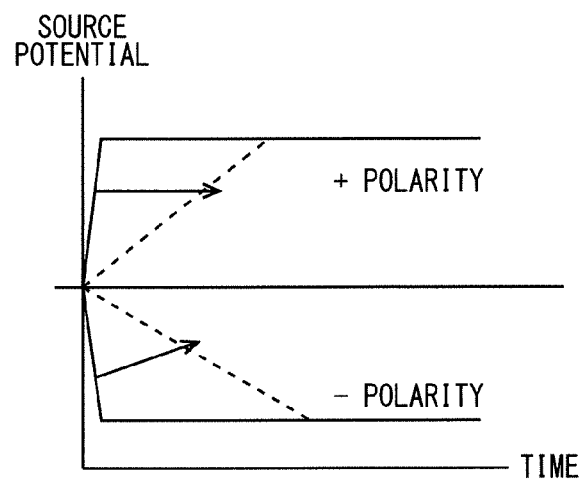
F I G . 2 5
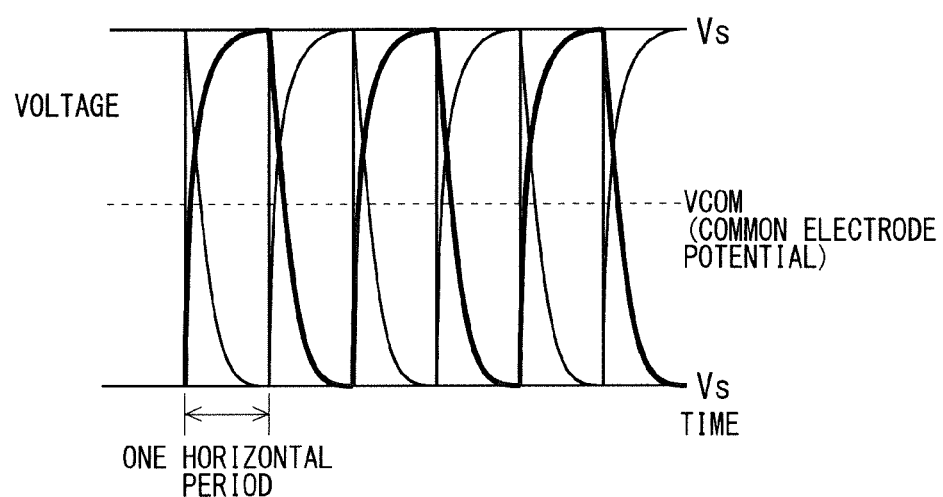

F I G . 2 6
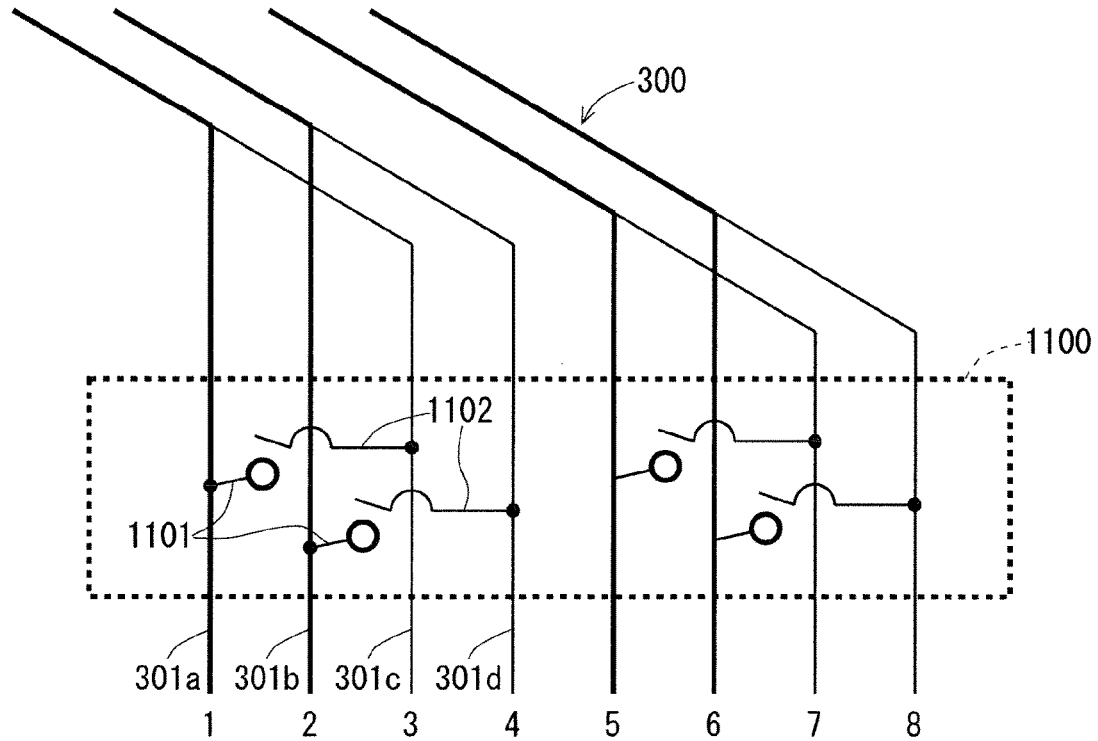

LIQUID CRYSTAL DISPLAY DEVICE

BACKGROUND OF THE INVENTION

Field of the Invention

The present technology relates to a liquid crystal display device.

Description of the Background Art

There are various needs in the market of liquid crystal display devices, such as high resolution, reduction in size of a peripheral region around a display region, or reduction in cost.

For example, if an attempt to increase resolution is made, the number of gate lines and the number of source lines are increased with this attempt. If reduction in cost is to be simultaneously implemented, it is necessary that the number of gate lines and the number of source lines output from one integrated circuit (IC) chip are increased to suppress an increase in the number of necessary components.

In addition, reduction in size of an IC chip is also demanded to suppress a unit price of the IC chip. The increase in the number of output lines per one IC chip and the reduction in size of the IC chip lead to decrease in spaces between output terminals of the IC chip.

In order to decrease the space between the output terminals and to simultaneously reduce size of the peripheral region, wiring width and wiring space of lead-out lines connecting the output terminals and the display region are also decreased.

The decrease in the wiring width and wiring space of the lead-out lines wired between a drive circuit mounted on the peripheral region and the display region entails deterioration in yield. Further, there are a limit for a wiring width and a limit for a wiring space in manufacture. Therefore, there are also limits upon decreasing a wiring width and wiring space.

As one of methods for solving the problem of the limits upon decreasing the wiring width and the wiring space, a method for implementing a multilayer structure of lead-out lines has been proposed (see, for example, Japanese Patent Application Laid-Open No. 2006-171387). With this method, lead-out lines are wired in a plurality of different layers, and the lead-out lines are wired as being overlapped with each other in a plan view. According to this, more lead-out lines than the case where the lead-out lines are wired with the limited width and limited space in manufacture in a single layer can be wired without increasing the peripheral region.

It is generally considered that the demand of decreasing the wiring width and wiring space of lead-out lines is higher for a source-line side than for a gate-line side. In the case where a drive circuit is incorporated in a liquid crystal panel to reduce the number of components, a gate drive circuit is more likely to be set as the circuit incorporated into the panel than a source drive circuit, because the gate drive circuit has a more simple structure than the source drive circuit.

However, when lead-out lines at the source-line side are formed to have a multilayer structure, an effect caused by parasitic capacitance formed between the lead-out lines overlapped with each other in a plan view becomes a problem. Specifically, capacitance coupling through an insulating layer occurs between the lead-out lines, and this causes rounding of a waveform of a source signal.

SUMMARY OF THE INVENTION

The present invention relates to a liquid crystal display device that can suppress an effect caused by parasitic capacitance, while implementing a multilayer structure of lead-out lines at a source-line side.

A liquid crystal display device according to one aspect of the present technology includes a display region to display an image; a plurality of lead-out lines led from the display region and arranged in a plan view; and an application circuit that applies a voltage to liquid crystal in the display region through each of the lead-out lines. Each of the lead-out lines includes a tilt portion wired with a directional component parallel to a peripheral direction enclosing the display region in a plan view. A difference between a voltage applied to one of the lead-out lines and a voltage applied to another one of the lead-out lines is defined as an applied voltage difference. The lead-out lines are wired such that, in a plan view, the tilt portion of one of the lead-out lines is overlapped with the tilt portion of another one of the lead-out lines having the applied voltage difference lower than the difference with adjacent one of the lead-out lines.

The applied voltage difference between the lead-out lines which are wired as being overlapped with each other in a plan view becomes smaller than the applied voltage difference with the adjacent lead-out line. Therefore, a multilayer structure can be implemented in the lead-out lines at the source-line side, and the effect caused by parasitic capacitance can be suppressed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram illustrating a waveform (shorting occurs) of a source signal in the liquid crystal display device according to the preferred embodiment;

FIG. 7 is a diagram illustrating a waveform (shorting does not occur) of a source signal in the liquid crystal display device according to the preferred embodiment;

FIG. 8 is a diagram illustrating a waveform (shorting occurs) of a source signal in the liquid crystal display device according to the preferred embodiment;

FIG. 18 is a diagram illustrating a polarity distribution (n frame) with a frame inversion method;

FIG. 19 is a diagram illustrating a polarity distribution (n+1 frame) with a frame inversion method;

FIG. 20 is a diagram illustrating a polarity distribution (n frame) with a line inversion method;

FIG. 21 is a diagram illustrating a polarity distribution (n+1 frame) with a line inversion method;

FIG. 22 is a diagram illustrating a polarity distribution (n frame) with a dot inversion method;

FIG. 23 is a diagram illustrating a polarity distribution (n+1 frame) with a dot inversion method;

FIG. 24 and FIG. 25 are diagrams each illustrating an effect (different polarity) caused by parasitic capacitance to a waveform of a source signal; and FIG. 26 and FIG. 27 are diagrams each schematically illustrating a structure of a short circuit.

DESCRIPTION OF THE PREFERRED EMBODIMENTS

Figure 1:
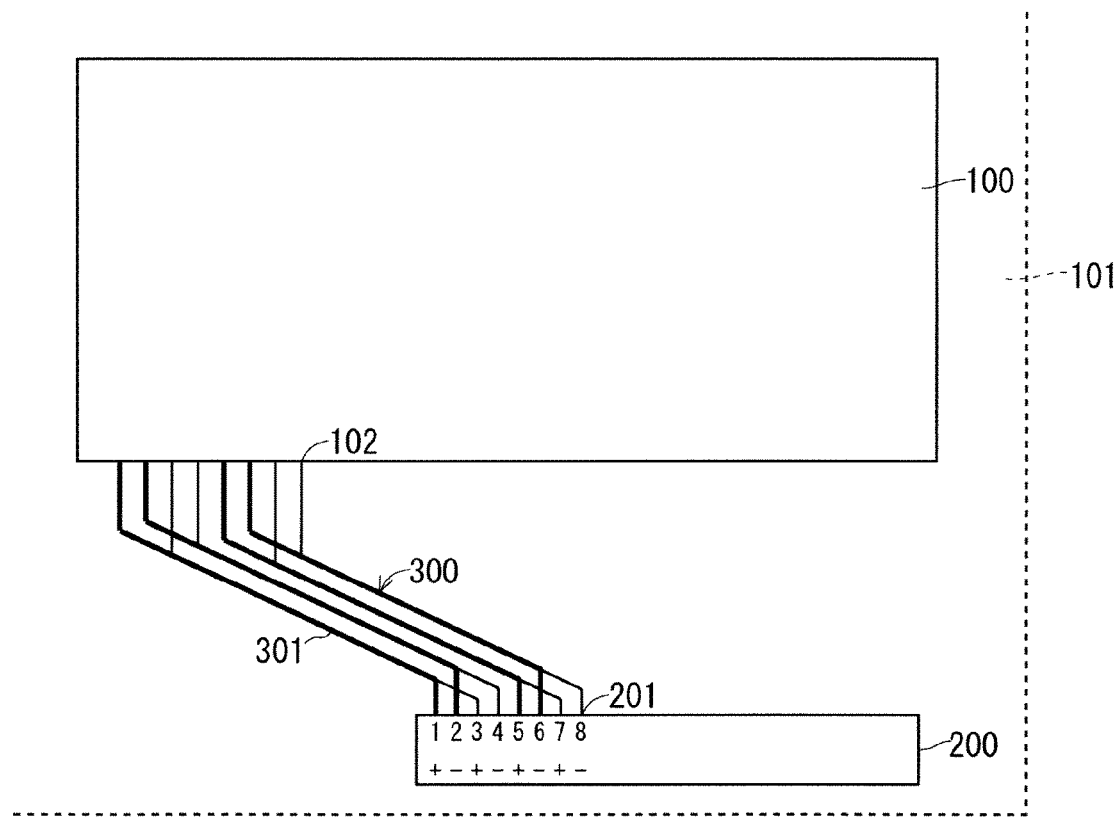
FIG. 1 is a diagram schematically illustrating a structure of a liquid crystal display device according to a preferred embodiment.

Preferred embodiments will be described below with reference to the accompanying drawings. Note that the drawings are schematically provided, and a size of an image and positional correlation illustrated in each of different drawings are not always correctly depicted, but may be changed as necessary. In the description below, the same elements are identified by the same reference numerals in the drawings, and the names and functions of these elements are also the same. Accordingly, the detailed description for these elements may sometimes be omitted.

In the description below, terms of "upper", "lower", "side", "bottom", "front", or "back" indicating a specific position and direction are sometimes used. However, these terms are used for the sake of convenience for facilitating understanding of the preferred embodiments, and do not relate to directions when the preferred embodiments are really embodied.

Figure 13:
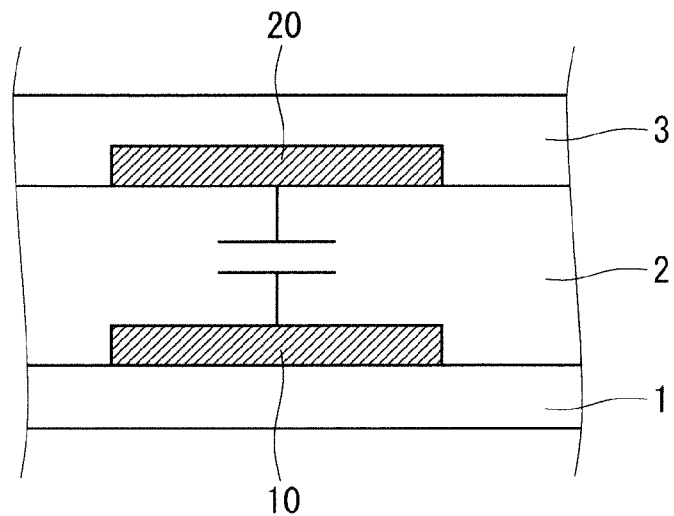
FIG. 13 is a diagram conceptually illustrating a formation of parasitic capacitance when lead-out lines at a source-line side are formed to have a multilayer structure.

FIG. 13 is a diagram conceptually illustrating a formation of parasitic capacitance when lead-out lines at a source-line side are formed to have a multilayer structure. The case where the lead-out lines at the source-line side are formed to have a multilayer structure will be described below. However, the present technology is applicable to the case where lead-out lines at a gate-line side are formed to have a multilayer structure. In the structure illustrated in FIG. 13, a lead-out line layer 10 is formed on the top surface of an insulating layer 1; an insulating layer 2 is formed to cover the top surface of the insulating layer 1 and the lead-out line layer 10; a lead-out line layer 20 is formed on the top surface of the insulating layer 2; and an insulating layer 3 is formed to cover the top surface of the insulating layer 2 and the lead-out line layer 20. In this structure, the lead-out line layer 10 and the lead-out line layer 20 are located to be overlapped with each other in a plan view.

When lead-out lines at the source-line side are layered, i.e., the lead-out line layer 10 and the lead-out line layer 20 are layered, capacitance coupling through the insulating layer 2 is formed between the lead-out lines, as illustrated in FIG. 13. The formation of such capacitance coupling causes rounding of a waveform of a source signal.

Figure 14:
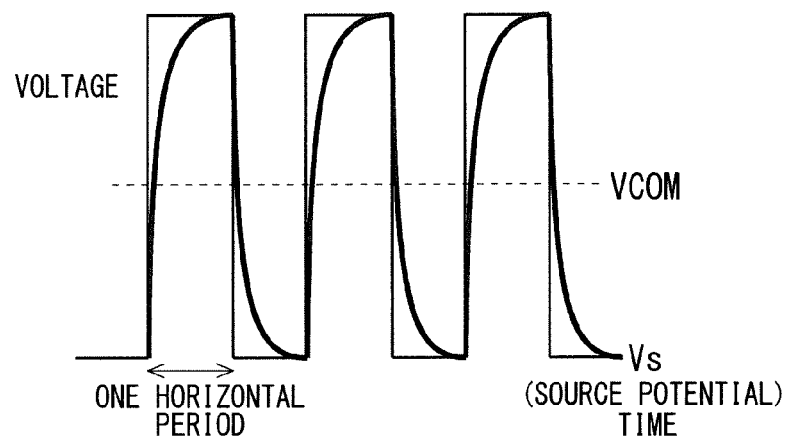
FIG. 14 is a diagram illustrating an effect caused by parasitic capacitance to a waveform of a source signal.

FIG. 14 is a diagram illustrating an effect caused by parasitic capacitance to the waveform of the source signal. In FIG. 14, a vertical axis indicates a voltage value, and a horizontal axis indicates a time. A rectangular waveform is ideal for the source signal.

When the parasitic capacitance is formed, rounding occurs on rising and falling of the waveform as illustrated in FIG. 14, compared to the case where the parasitic capacitance is not formed.

Figure 15:
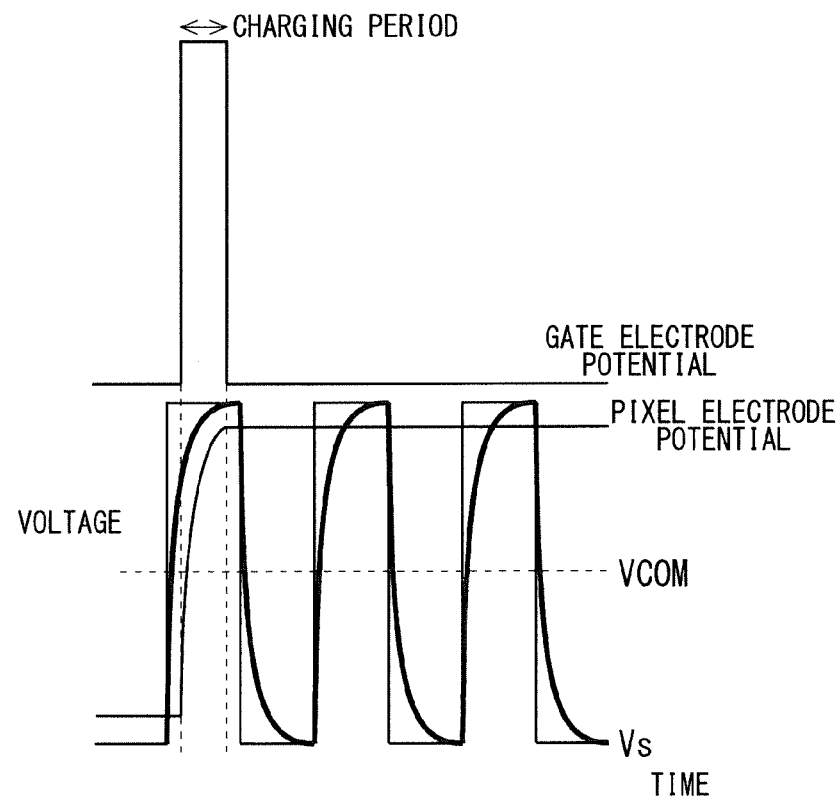
FIG. 15 is a diagram illustrating an effect (low charging capability) caused by parasitic capacitance to a waveform of a source signal.

FIG. 15 is a diagram illustrating an effect caused by parasitic capacitance to the waveform of the source signal. In FIG. 15, a vertical axis indicates a voltage value, and a horizontal axis indicates a time. A rectangular waveform is ideal for the source signal. FIG. 15 also illustrates a potential of a gate electrode. FIG. 15 also illustrates a potential of a pixel electrode.

When the parasitic capacitance is formed, rounding occurs on rising and falling of the waveform as illustrated in FIG. 15, compared to the case where the parasitic capacitance is not formed. When the rounding is large, and charging capability of a thin film transistor (TFT) is low, a pixel potential does not reach a sufficient value during a charging period. This deteriorates contrast of an image displayed with a liquid crystal display device. Accordingly, proper display characteristic is not obtained.

Figure 16:
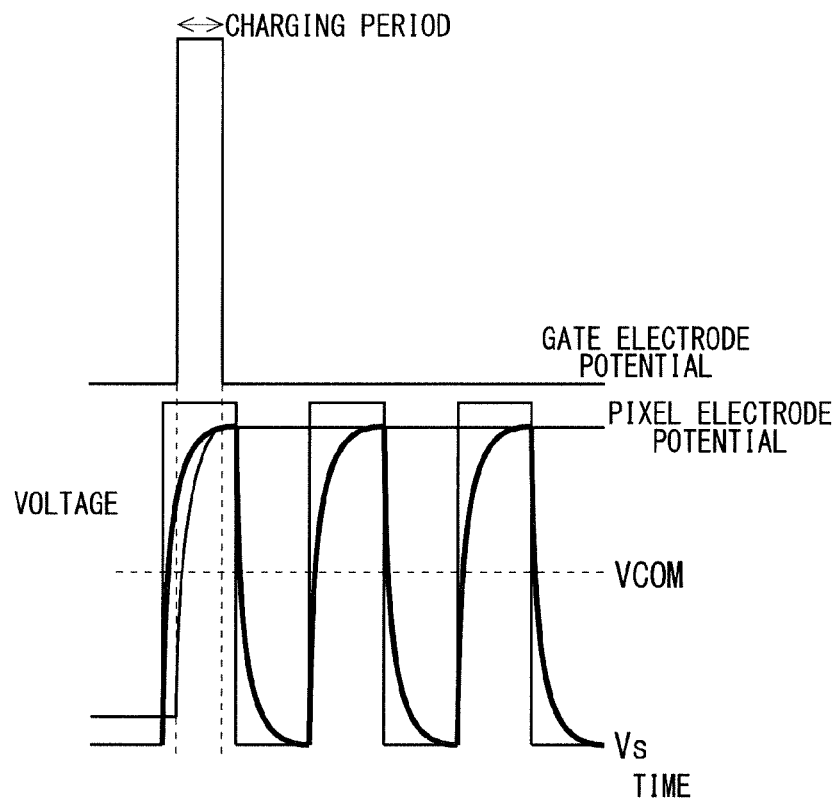
FIG. 16 is a diagram illustrating an effect (large rounding) caused by parasitic capacitance to a waveform of a source signal.

FIG. 16 is a diagram illustrating an effect caused by parasitic capacitance to the waveform of the source signal. In FIG. 16, a vertical axis indicates a voltage value, and a horizontal axis indicates a time. A rectangular waveform is ideal for the source signal. FIG. 16 also illustrates a potential of a gate electrode. FIG. 16 also illustrates a potential of a pixel electrode.

When the parasitic capacitance is formed, rounding occurs on rising and falling of the waveform as illustrated in FIG. 16, compared to the case where the parasitic capacitance is not formed. When the rounding is large and a source potential $V_S$ does not reach a desired value during the charging period, proper display characteristic is not obtained either, even if the charging capability of the TFT is sufficiently high.

From the above, the rounding of the waveform of the source signal caused by the parasitic capacitance has to be suppressed.

It is necessary here that a voltage applied to liquid crystal is an AC voltage in the liquid crystal display device. When the state in which a DC voltage is applied to liquid crystal is continued for a certain period of time, ionic materials in the liquid crystal flow and are fixed to an electrode. This might cause deterioration in display quality, such as burning.

Figure 17:
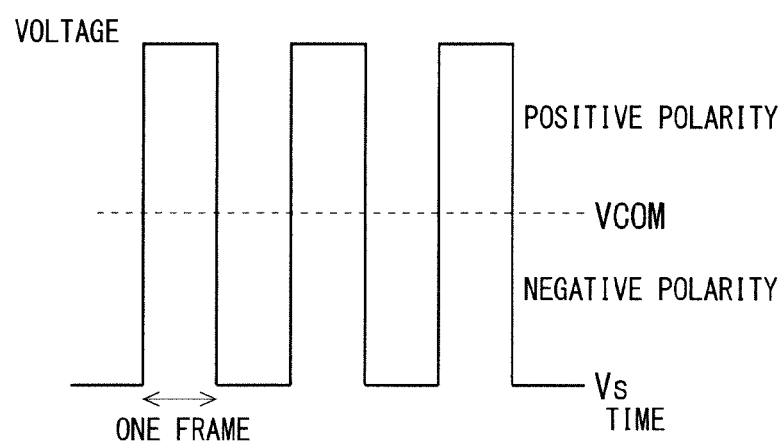
FIG. 17 is a diagram illustrating an ideal waveform of a source signal.

FIG. 17 is a diagram illustrating an ideal waveform of a source signal. In FIG. 17, a vertical axis indicates a voltage value, and a horizontal axis indicates a time.

When an AC voltage is applied, the relation between a common electrode potential $V_{COM}$ and a source potential $V_S$ is inverted every frame as illustrated in FIG. 17. The case where the source potential $V_S$ is higher than the common electrode potential $V_{COM}$ is referred to as a positive polarity, and the case where the source potential $V_S$ is lower than the common electrode potential $V_{COM}$ is referred to as a negative polarity.

In addition, there are one or more types in a polarity distribution method in a display region, when an AC voltage is applied. For example, there are a frame inversion method, a line inversion method, and a dot inversion method.

Figures 18, 19, 20:
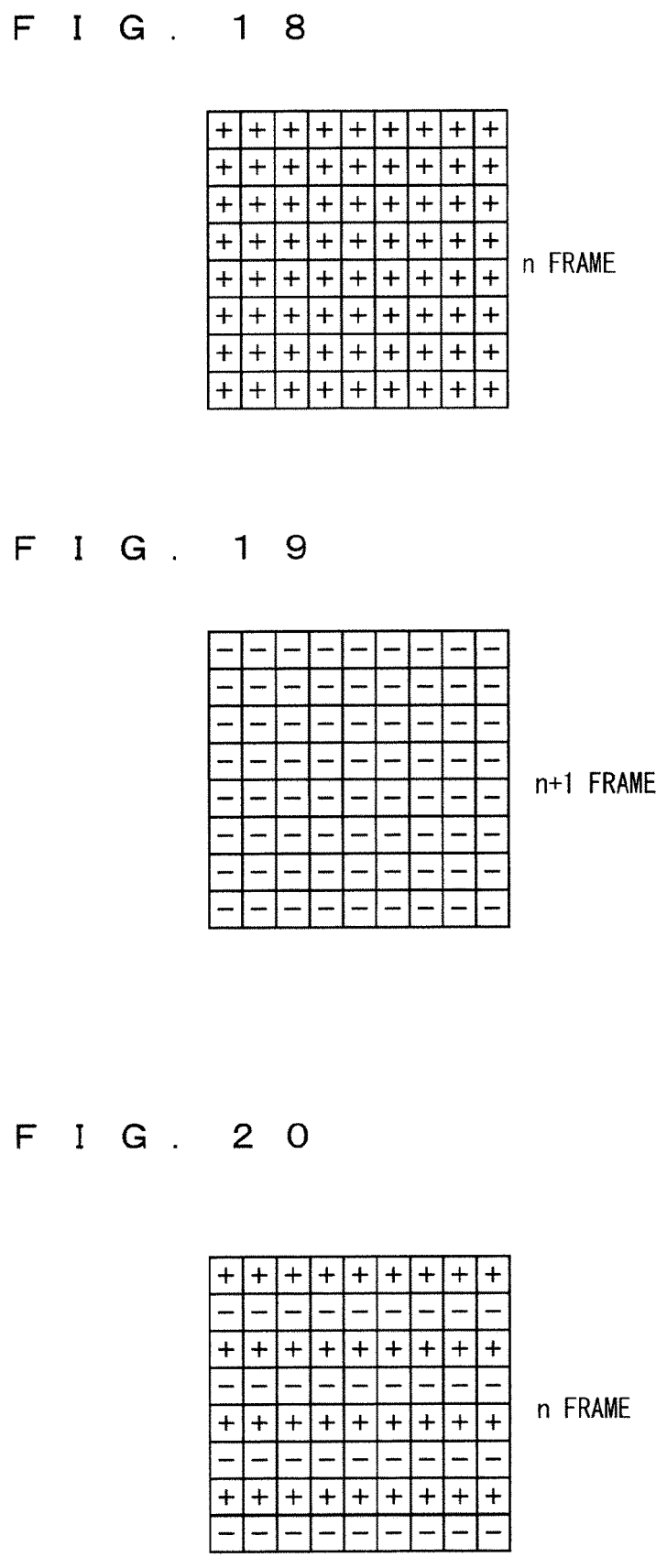

FIGS. 18 and 19 are diagrams illustrating a polarity distribution with a frame inversion method. FIG. 18 is a diagram illustrating a polarity distribution in a display region in n frame, and FIG. 19 is a diagram illustrating a polarity distribution in a display region of n+1 frame (next frame of n frame).

As illustrated in FIGS. 18 and 19, source potential $V_S$ is written such that pixels on the entire region in one frame have the same polarity with the frame inversion method.

Figures 21, 22, 23:
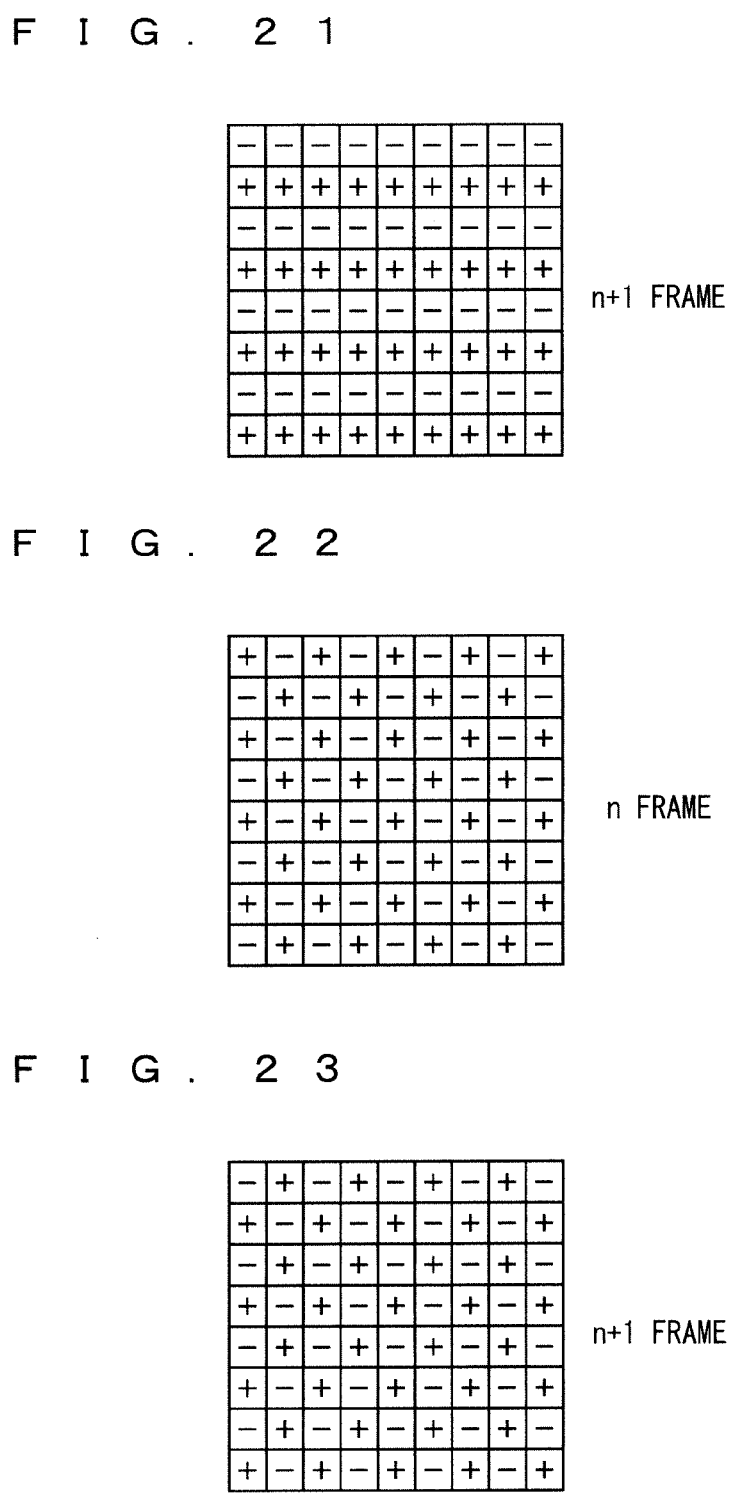

FIGS. 20 and 21 are diagrams illustrating a polarity distribution with a line inversion method. FIG. 20 is a diagram illustrating a polarity distribution in a display region in n frame, and FIG. 21 is a diagram illustrating a polarity distribution in a display region of n+1 frame (next frame of n frame).

With the line inversion method, pixels on horizontal lines have the same polarity, and pixels on a horizontal line and pixels on the adjacent horizontal line have different polarity as illustrated in FIGS. 20 and 21.

FIGS. 22 and 23 are diagrams illustrating a polarity distribution with a dot inversion method. FIG. 22 is a diagram illustrating a polarity distribution in a display region in n frame, and FIG. 23 is a diagram illustrating a polarity distribution in a display region of n+1 frame (next frame of n frame).

With the dot inversion method, the source potential $V_S$ is written such that each pixel has a polarity different from polarities of the vertically-adjacent pixels and laterally-adjacent pixels as illustrated in FIGS. 22 and 23.

When the frame inversion method is employed out of these methods, flickering or luminous gradient in a screen might occur. When the line inversion method is employed, lateral crosstalk caused by convergence of the common electrode potential $V_{COM}$ might occur. Therefore, the dot inversion method is often employed from the viewpoint of enhancing display quality.

FIGS. 24 and 25 are diagrams illustrating an effect of parasitic capacitance to a waveform of a source signal. In FIGS. 24 and 25, a vertical axis indicates a voltage value, and a horizontal axis indicates a time.

FIG. 24 illustrates the state in which the rising of the source signal is rounded with capacitance coupling, when a voltage of different polarity is applied to each of the opposing lines. FIG. 25 illustrates a waveform of a source signal having rounded rising and rounded falling for both polarities, compared to an ideal rectangular waveform of a source signal.

The degree of rounding of the waveform of the source signal is affected by the potential difference between the opposing lines as illustrated in FIGS. 24 and 25. The larger the potential difference is, the larger the rounding of the waveform of the source signal becomes. With the dot inversion method, the adjacent line has a potential of opposite phase, i.e., potential with different polarity. Therefore, in the multilayer structure in which a line is overlapped with the adjacent line, a larger rounding of waveform occurs than the frame inversion method and the line inversion method.

First Preferred Embodiment

<Configuration>

A liquid crystal display device according to the present preferred embodiment will be described below.

FIG. 1 is a diagram schematically illustrating a structure of a liquid crystal display device according to the present preferred embodiment. As illustrated in FIG. 1, the liquid crystal display device includes a display region 100 for displaying an image, a drive circuit 200 for controlling an image display on the display region 100, and a plurality of lead-out lines 300 connecting the display region 100 and the drive circuit 200. The lead-out lines 300 are led from the display region 100, and arranged in a plan view.

In the display region 100, source lines (not illustrated here) and gate lines (not illustrated here) are provided, and orientation of liquid crystals (not illustrated here) is controlled to display an image. A peripheral region 101 enclosing the display region 100 is placed around the display region 100, and this peripheral region 101 corresponds to a frame or the like of the display region 100.

Source terminals 201 of the drive circuit 200 are connected to terminals 102 of the display region 100 at the side of the source lines through the lead-out lines 300. The drive circuit 200 controls orientation of liquid crystals (not illustrated here) by applying a voltage to the liquid crystals in the display region 100, thereby displaying an image on the display region 100.

Supposing that the liquid crystal display device is driven with the dot inversion method, a source signal output from each of the source terminals 201 has an output polarity different from a polarity of a source signal from another adjacent source terminal 201.

Each of the lead-out lines 300 includes a taper line 301 on at least a part thereof the taper line 301 being wired with a directional component parallel to the peripheral direction enclosing the display region 100, i.e., parallel to a direction along the peripheral region 101, in a plan view.

Figure 2:
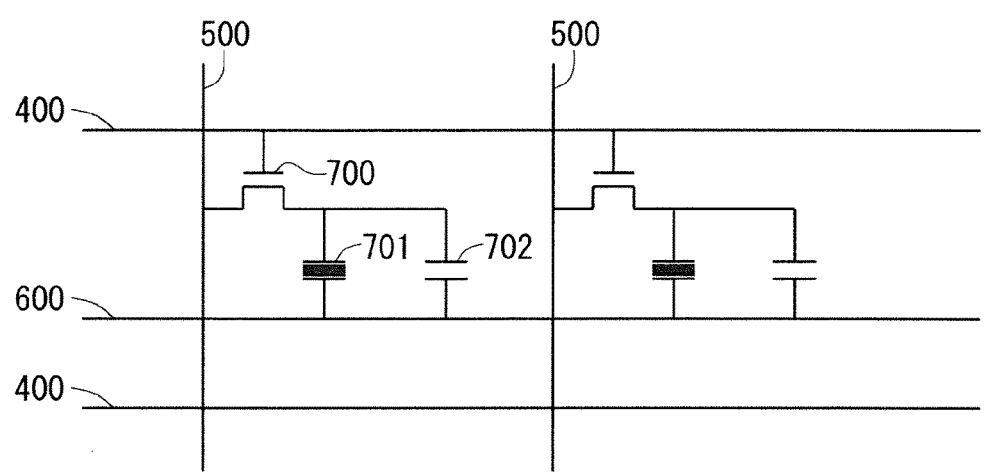
FIG. 2 is a diagram illustrating the structure in a display region in more detail.

FIG. 2 is a diagram illustrating the structure in the display region 100 in more detail. As illustrated in FIG. 2, a TFT 700 is mounted at a crossing point between a gate line 400 and a source line 500.

A liquid crystal capacitance 701 and a storage capacitance 702 are connected to a drain side of each TFT 700. The side of the liquid crystal capacitance 701 opposite to the side connected to the TFT 700 and the side of the storage capacitance 702 opposite to the side connected to the TFT 700 are respectively connected to a common electrode 600.

When a voltage is applied to the gate line 400, the TFT 700 is turned ON, so that current flows between the source and the drain. Then, a voltage is applied to the liquid crystal capacitance 701 and the storage capacitance 702, and charges according to the voltage are stored in the storage capacitance 702.

Figure 3:
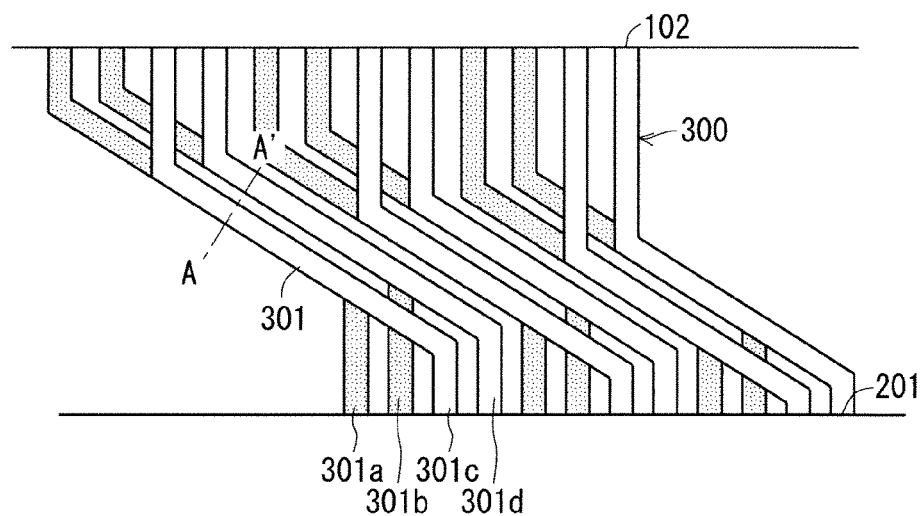
FIG. 3 is a diagram illustrating a portion where lead-out lines are wired in FIG. 1, the portion being enlarged.

FIG. 3 is a diagram illustrating the portion where the lead-out lines 300 are wired in FIG. 1, the portion being enlarged. As illustrated in FIG. 3, in a plan view, the taper line 301 of the lead-out line 300 is wired to be overlapped with every other taper line 301, i.e., the taper line 301 next to a taper line 301 adjacent to the taper line 301. Specifically, a taper line 301a is wired as being overlapped with every other taper line 301c, and a taper line 301b is wired as being overlapped with every other taper line 301d.

Figure 4:
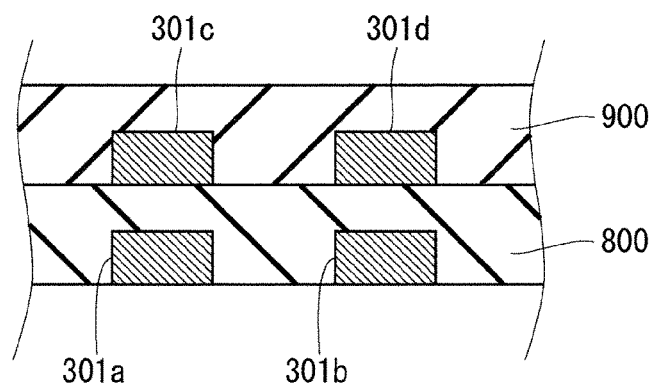
FIG. 4 is a sectional view illustrating a wiring pattern of taper lines.

FIG. 4 is a sectional view illustrating a wiring pattern of the taper lines 301. The sectional view illustrated in FIG. 4 corresponds to the section along a line A-A' in FIG. 3.

As illustrated in FIG. 4, the taper line 301a and the taper line 301b are wired in an insulating layer 800, and the taper line 301c and the taper line 301d, which are every other taper lines of the taper line 301a and the taper line 301b, are wired in an insulating layer 900 at the positions overlapped with the corresponding taper lines in a plan view. The insulating layer 800 and the insulating layer 900 form a layer structure in the peripheral region 101, and this layer structure has a layered direction in the normal direction of a main plane of the display region 100.

As described above, when the liquid crystal display device is supposed to be driven with the dot inversion method, the source signals output from the source terminals 201 adjacent to each other have different output polarity. On the other hand, the source signal output from a certain source terminal 201 and the source signal output from every other source terminal 201 of the certain source terminal have the same output polarity.

Therefore, with the configuration in which the taper line 301 of the lead-out line 300 is wired as being overlapped with every other taper line 301, the phases of the source signals for the overlapped taper lines 301 become the same. Accordingly, rounding of the waveform of the source signal caused by capacitance coupling can be suppressed, compared to the case where taper lines 301 transmitting source signals having different output polarity are overlapped with each other.

Even in the case where the liquid crystal display device is supposed to be driven with other inversion methods, if at least a certain taper line 301 is wired as being overlapped with another taper line 301 that can implement a lower applied potential difference than a difference (applied potential difference) with a voltage applied to the adjacent taper line 301 in a plan view, rounding of waveforms of source signals caused by capacitance coupling can be suppressed, compared to the case where the certain taper line 301 is overlapped with the adjacent taper line 301.

<Operation>

Figure 5:
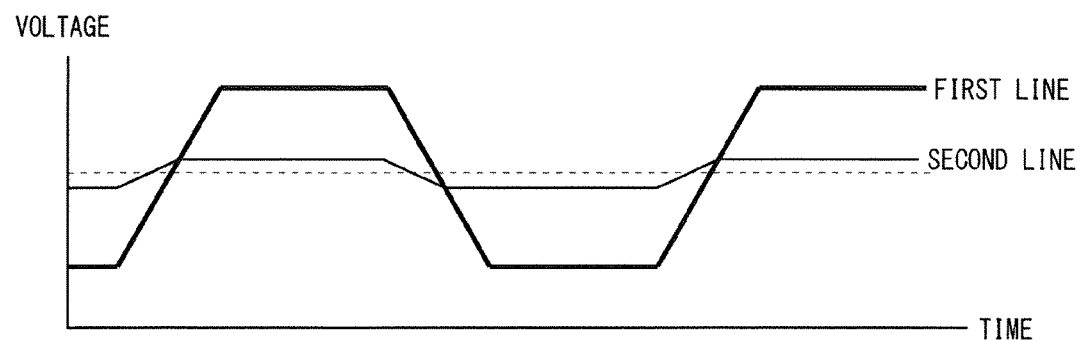
FIG. 5 is a diagram illustrating a waveform (shorting does not occur) of a source signal in the liquid crystal display device according to the preferred embodiment.

FIGS. 5 and 6 are diagrams illustrating waveforms of source signals in the liquid crystal display device according to the present preferred embodiment. In FIGS. 5 and 6, a vertical axis indicates a voltage value, and a horizontal axis indicates a time.

A first line and a second line in FIGS. 5 and 6 are disposed in different insulating layers. Specifically, in the case where the first line is disposed in the insulating layer 800, the second line is disposed in the insulating layer 900. Note that, in FIGS. 5 and 6, a line indicating the first line is bold, while a line indicating the second line is fine.

In the waveform illustrated in FIG. 5, a source potential of the first line and a source potential of the second line are changed. On the other hand, in the waveform illustrated in FIG. 6, the first line and the second line are shorted to each other before each source potential is changed. Thereafter, each source potential is changed as in FIG. 5.

The shorting illustrated in FIG. 6 may be performed by using an external drive circuit such as an IC, or by using a circuit for shorting provided in the liquid crystal display device.

FIG. 26 is a diagram schematically illustrating the structure of a short circuit used in the above embodiment. As illustrated in FIG. 26, a short circuit 1100 is disposed at the position adjacent to the lead-out lines 300.

As illustrated in FIG. 26, a taper line 301a is wired as being overlapped with every other taper line 301c, and a taper line 301b is wired as being overlapped with every other taper line 301d.

The short circuit 1100 includes a shorting switch 1101 connected to the taper line 301a and a shorting switch 1102 connected to the taper line 301c, for example. The short circuit 1100 also includes a shorting switch 1101 connected to the taper line 301b and a shorting switch 1102 connected to the taper line 301d, for example. The taper line 301a and the taper line 301c are shorted with the connection between the shorting switch 1101 connected to the taper line 301a and the shorting switch 1102 connected to the taper line 301c. The taper line 301b and the taper line 301d are shorted with the connection between the shorting switch 1101 connected to the taper line 301b and the shorting switch 1102 connected to the taper line 301d. FIG. 26 illustrates the state in which shorting does not occur.

With the execution of the above shorting operation, the first line and the second line are shorted to each other before each source potential is changed.

When it is supposed that one is in a low tone and the other is in a high tone out of previous pixels in a previous frame, and similarly, one is in a low tone and the other is in a high tone out of present pixels in a present frame, a potential variation range when the pixels at the low tone side are changed to the high tone side is close to the potential of the high tone relative to a fixed potential, because there is little potential variation at the low tone side. When the large potential variation is implemented with the method illustrated in FIG. 5, the effect of rounding of the waveform caused by parasitic capacitance is also large, and power required for the potential variation also becomes large.

On the other hand, when the first line and the second line are shorted to each other before each source potential is changed, the first line and the second line have the same potential after being shorted, as illustrated in FIG. 6.

Therefore, at the timing of writing the source potential, i.e., at the timing of changing the source potential, the voltage value of the second line at the low tone side is shifted to the high tone side. On the contrary, at this timing, the voltage value of the first line at the high tone side is shifted to the low tone side. In this way, the voltage value of the first line and the voltage value of the second line can be varied without applying power, whereby the necessary potential variation range can be decreased.

Accordingly, with this method, the rounding of the waveform of the source signal caused by the capacitance coupling between the first line and the second line is reduced. In addition, power required for the potential variation is also reduced.

Second Preferred Embodiment

A liquid crystal display device according to the present preferred embodiment will be described. In the description below, the configurations similar to the configurations described in the above preferred embodiment are identified by the same reference numerals, and their detailed description will be omitted as necessary.

Figures 9, 10:
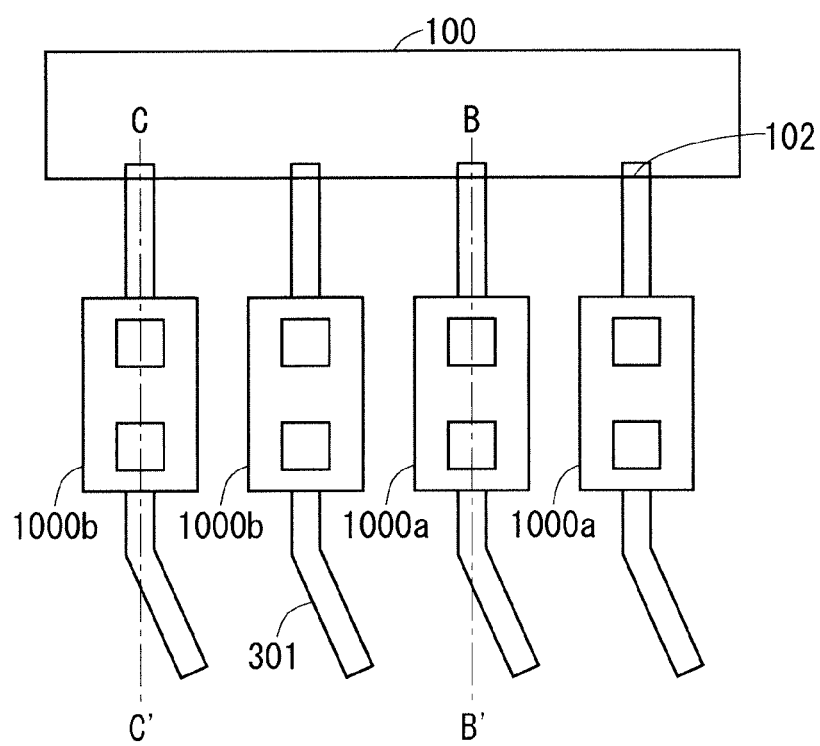
FIG. 9 is a diagram illustrating a polarity distribution with a 1×2 dot inversion method.
FIG. 10 is a diagram illustrating a portion where lead-out lines are wired, the portion being enlarged.

FIGS. 7 and 8 are diagrams illustrating waveforms of source signals in the liquid crystal display device according to the second preferred embodiment. However, it is supposed that the liquid crystal display device is driven with 1×2 dot inversion method in which the same polarity appears twice in a row in a column direction or with 1×X dot inversion method in which the same polarity appears twice or more in a row in a column direction, as illustrated in FIG. 9. In FIGS. 7 and 8, a vertical axis indicates a voltage value, and a horizontal axis indicates a time.

A first line and a second line in FIGS. 7 and 8 are disposed in different insulating layers. Specifically, in the case where the first line is disposed in the insulating layer 800, the second line is disposed in the insulating layer 900. Note that, in FIGS. 7 and 8, a line indicating the first line is bold, while a line indicating the second line is fine.

In the waveform illustrated in FIG. 7, a source potential of the first line and a source potential of the second line are changed. On the other hand, in the waveform illustrated in FIG. 8, the first line and the second line are shorted to an intermediate potential of the polarity written in the next frame, before each source potential is changed. Thereafter, each source potential is changed as in FIG. 7.

With this, rounding of the waveform of the source signal caused by the capacitance coupling between the first line and the second line is reduced also in the case where the liquid crystal display device is driven with the 1×2 dot inversion method or 1×X dot inversion method. In addition, power required for the potential variation is also reduced.

The present preferred embodiment can also prevent the occurrence of difference in charging rate due to the difference in the degree of the rounding of the source signal between the timing at which the source potential is changed to different polarity and the timing at which the source potential is changed to the same polarity. Accordingly, the effect to the display characteristic by this difference can also be reduced.

Figure 27:
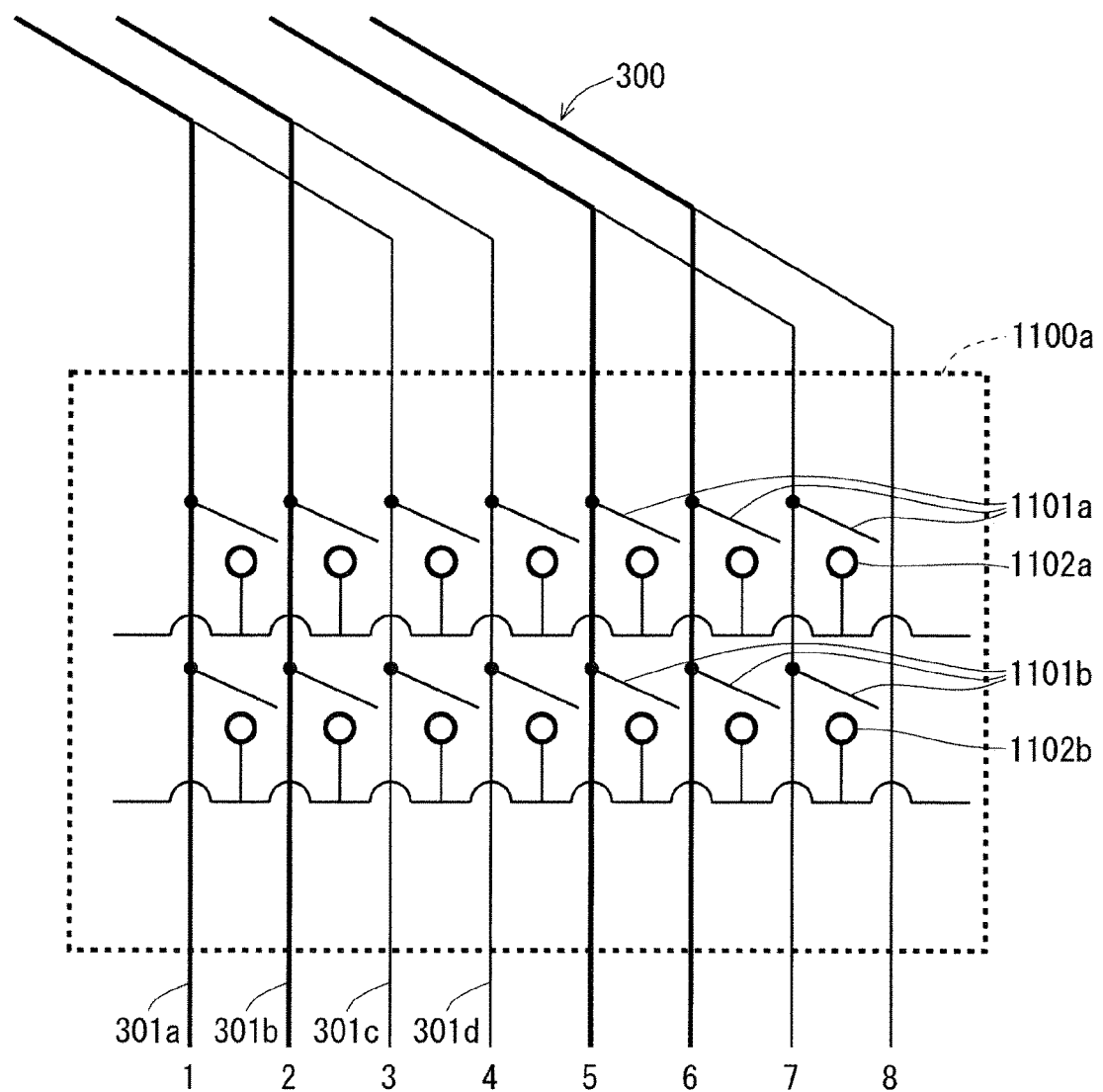

FIG. 27 is a diagram schematically illustrating the structure of a short circuit used in the above embodiment. As illustrated in FIG. 27, a short circuit 1100a is disposed at the position adjacent to the lead-out lines 300.

As illustrated in FIG. 27, a taper line 301a is wired as being overlapped with every other taper line 301c, and a taper line 301b is wired as being overlapped with every other taper line 301d.

The short circuit 1100a includes a shorting switch 1101a connected to the taper line 301a and a shorting switch 1101b connected to the taper line 301a, for example. The short circuit 1100a includes a shorting switch 1101a connected to the taper line 301b and a shorting switch 1101b connected to the taper line 301b, for example.

The short circuit 1100a also includes a shorting switch 1102a that allows each taper line to be shorted to an intermediate potential of a positive polarity, and a shorting switch 1102b that allows each taper line to be shorted to an intermediate potential of a negative polarity.

The shorting switch 1101a connected to the taper line 301a and the shorting switch 1102a are connected to each other, whereby the taper line 301a is shorted to the intermediate potential of a positive polarity. The shorting switch 1101b connected to the taper line 301a and the shorting switch 1102b are connected to each other, whereby the taper line 301a is shorted to the intermediate potential of a negative polarity.

Similarly, the shorting switch 1101a connected to the taper line 301b and the shorting switch 1102a are connected to each other, whereby the taper line 301b is shorted to the intermediate potential of a positive polarity. The shorting switch 1101b connected to the taper line 301b and the shorting switch 1102b are connected to each other, whereby the taper line 301b is shorted to the intermediate potential of a negative polarity. FIG. 27 illustrates the state in which shorting does not occur.

For example, when the source potential applied next to the taper line 301a and the taper line 301c has a positive polarity, the shorting switch 1101a connected to the taper line 301a and the shorting switch 1102a are connected to each other, and the shorting switch 1101a connected to the taper line 301c and the shorting switch 1102a are connected to each other, before the source potential is changed. With this, the taper line 301a and the taper line 301c are shorted to the intermediate potential of the positive polarity.

For example, when the source potential applied next to the taper line 301b and the taper line 301d has a negative polarity, the shorting switch 1101b connected to the taper line 301b and the shorting switch 1102b are connected to each other, and the shorting switch 1101b connected to the taper line 301d and the shorting switch 1102b are connected to each other, before the source potential is changed. With this, the taper line 301b and the taper line 301d are shorted to the intermediate potential of the negative polarity.

Third Preferred Embodiment

A liquid crystal display device according to the present preferred embodiment will be described. In the description below, the configurations similar to the configurations described in each of the above preferred embodiments are identified by the same reference numerals, and their detailed description will be omitted as necessary.

FIG. 10 is a diagram illustrating a portion where lead-out lines are wired according to the present preferred embodiment, the portion being enlarged. More specifically, FIG. 10 is a diagram illustrating a region between a taper line 301 and an end of a lead-out line, the end being connected to a terminal 102 of a display region 100.

As illustrated in FIG. 10, the liquid crystal display device includes a conversion unit in the region between the taper line 301 and the end connected to the terminal 102 of the display region 100. Indium tin oxide is considered as a material of the conversion unit. The other configurations are similar to those in the first preferred embodiment.

Figure 11:
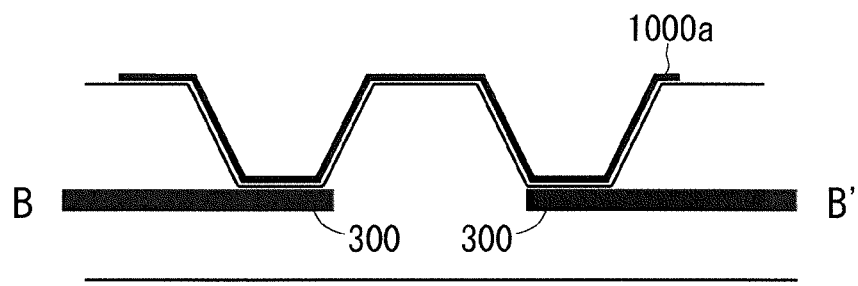
FIG. 11 is a sectional view corresponding to the section along a line B-B' in FIG. 10.
Figure 12:
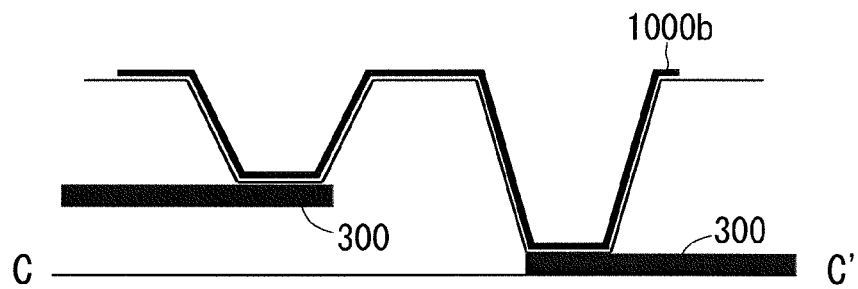
FIG. 12 is a sectional view corresponding to the section along a line C-C' in FIG. 10.

FIG. 11 is a sectional view corresponding to the section along a line B-B' in FIG. 10. FIG. 12 is a sectional view corresponding to the section along a line C-C' in FIG. 10.

In the structure illustrated in the first preferred embodiment, the wiring height of the lead-out line 300 wired in the insulating layer 800 and the wiring height of the lead-out line 300 wired in the insulating layer 900 are different from each other, i.e., the heights in the normal direction of the display region 100 are different from each other. Therefore, in order to similarly connect both lead-out lines 300 to the terminals 102 of the display region 100, the height of the lead-out line 300 wired in the insulating layer 800 and the height of the lead-out line 300 wired in the insulating layer 900 has to be aligned at the end connected to the terminals 102 of the display region 100.

In this case, when only one of the lead-out lines 300 is wired through the conversion unit to change the height of only this lead-out line 300, resistance is different between the lead-out line 300 wired through the conversion unit and the lead-out line 300 wired without using the conversion unit. Therefore, delay occurs due to the difference in resistance.

In view of this, in the present preferred embodiment, the lead-out line 300 wired in the insulating layer 800 and the lead-out line 300 wired in the insulating layer 900 are mounted such that the heights of the ends connected to the terminals 102 of the display region 100 are aligned and both lines are wired through a conversion unit 1000a and a conversion unit 1000b, which have the same resistance value, in order to reduce the delay caused by the difference in the resistance. In FIGS. 10 to 12, the conversion unit 1000a is connected to the lead-out line 300 that does not need to change the height, and the conversion unit 1000b is connected to the lead-out line 300 that needs to change the height.

With this configuration, the lead-out lines 300 wired in the different insulating layers are connected to the terminals 102 of the display region 100 with the same height. In addition, the delay caused by the difference in resistance can be reduced, since both lead-out lines 300 are connected to the conversion units having the same resistance value.

<Effect>

The effects of the above preferred embodiments will be described below.

The liquid crystal display device according to the above preferred embodiments includes the display region 100 for displaying an image using liquid crystal, a plurality of lead-out lines 300, and the drive circuit 200 included in an application circuit.

The lead-out lines 300 are led from the display region 100, and arranged in a plan view.

The drive circuit 200 applies a voltage to liquid crystal in the display region 100 through each of the lead-out lines 300.

Each of the lead-out lines 300 includes a taper line 301 that is included in a tilt portion wired with a directional component parallel to a peripheral direction enclosing the display region 100 in a plan view.

When a difference between a voltage applied to one of the lead-out lines 300 and a voltage applied to another one of lead-out lines 300 is specified as an applied voltage difference, each of the lead-out lines 300 is wired such that the taper line 301 of one of the lead-out lines 300 is overlapped with the taper line 301 of another one of lead-out lines 300 having an applied voltage difference lower than a difference with adjacent one of the lead-out lines 300.

With this configuration, the applied voltage difference between the lead-out lines which are wired as being overlapped with each other in a plan view becomes smaller than the applied voltage difference with the adjacent lead-out line. Therefore, a multilayer structure can be implemented in the lead-out lines 300 mainly at the tilt portion at the source line side, and the effect caused by parasitic capacitance can be suppressed.

Accordingly, the occurrence of rounding on a waveform of a source signal can be prevented.

Notably, the configurations other than these configurations may be omitted as necessary. However, the above effects can be provided, even if at least one of the other configurations described in the present specification is added as necessary.

According to the above preferred embodiments, the drive circuit 200 applies a voltage with the same polarity to each of the lead-out lines 300 wired as being overlapped with each other.

With this configuration, the lead-out lines to which a voltage with the same polarity is applied are wired as being overlapped with each other in a plan view, whereby the applied voltage difference is reduced, and the effect caused by capacitance coupling can be suppressed.

According to the above preferred embodiments, the liquid crystal display device includes a short circuit that causes the lead-out lines 300, which are wired as being overlapped with each other, to be shorted to each other. The voltage applied to each of the lead-out lines 300 by the drive circuit 200 is changed in time series.

The drive circuit 200 applies a changed voltage to each of the lead-out lines 300, which are shorted to each other with the short circuit and then released from the shorting.

With this configuration, a necessary potential variation range becomes small upon applying the changed voltage, whereby rounding caused by capacitance coupling can be suppressed. This configuration can also reduce power required for the potential variation.

According to the above preferred embodiments, the short circuit causes the lead-out lines 300, which are wired as being overlapped with each other, to be shorted to an intermediate potential with the polarity same as the polarity of a voltage which is changed next in time series.

With this configuration, a necessary potential variation range becomes small upon applying the changed voltage, whereby rounding caused by capacitance coupling can be suppressed. This configuration can also reduce power required for the potential variation.

According to the above preferred embodiments, the liquid crystal display device includes a conversion unit provided to align height of ends of the lead-out lines 300, which are wired as being overlapped with each other, in the normal direction of the display region 100, the ends being connected to the display region 100. Specifically, a conversion unit 1000a or a conversion unit 1000b is provided to an end of each of the lead-out lines 300 connected to the display region 100.

The conversion unit 1000a and the conversion unit 1000b on each of the lead-out lines 300 have the same resistance value.

With this configuration, the lead-out lines wired in different insulating layers, e.g., the lead-out line wired in the insulating layer 800 and the lead-out line wired in the insulating layer 900, are connected with the same height at the ends connected to the display region 100. In addition, the delay caused by the difference in resistance can be reduced, since both lead-out lines 300 are connected to the conversion unit 1000a or the conversion unit 1000b having the same resistance value.

<Modification>

The above preferred embodiments sometimes describe material quality, materials, sizes, shapes, relative arrangement relation, or embodying conditions. However, these are exemplary in all aspects, and not limited to those described in the present specification. Therefore, innumerable modifications not illustrated are assumed within the scope of the present technology. For example, the present invention includes the case where at least one element is modified, added, or omitted, and the case where at least one element in at least one preferred embodiment is extracted and combined to the elements of the other preferred embodiments.

Unless inconsistency arises, "an" element provided in the above preferred embodiments may be "one or more". In addition, each element is a conceptual unit, and the present invention includes the case where one element includes a plurality of structures, the case where one element corresponds to a part of a certain structure, and the case where a plurality of elements is provided in one structure. Each element includes a structure having other structures or shapes, so long as it shows the same function.

The description in the present specification should be referred to for all purposes of the present technology, and should not be construed as prior arts.

In the above preferred embodiments, when a name of a material is described without being particularly specified, a material containing other additives in this material, such as an alloy, is included, unless inconsistency arises.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   a display region to display an image;
   a plurality of lead-out lines led from said display region and arranged in a plan view; and
   an application circuit that applies a voltage to liquid crystal in said display region through each of said plurality of lead-out lines, wherein each of said lead-out lines has a tilt portion wired with a directional component parallel to a peripheral direction enclosing said display region in a plan view, a difference between a voltage applied to one of said lead-out lines and a voltage applied to another one of said lead-out lines is specified as an applied voltage difference, and each of said lead-out lines is wired such that, in a plan view, said tilt portion of one of said lead-out lines is overlapped with said tilt portion of another one of said lead-out lines having said applied voltage difference lower than a difference with adjacent one of said lead-out lines.

2. The liquid crystal display device according to claim 1, wherein said application circuit applies a voltage with the same polarity to each of said lead-out lines which are wired as being overlapped with each other.

3. The liquid crystal display device according to claim 1, further comprising:

a short circuit that causes each of said lead-out lines, which are wired as being overlapped with each other, to be shorted to each other, wherein a voltage applied to each of said lead-out lines by said application circuit is changed in time series, and said application circuit applies a changed voltage to each of said lead-out lines, which are released from the shorting after shorted to each other by said short circuit.

4. The liquid crystal display device according to claim 3, wherein said short circuit causes each of said lead-out lines, which are wired as being overlapped with each other, to be shorted to an intermediate potential with a polarity same as a polarity of a voltage which is changed next in time series.

5. A liquid crystal display device according to claim 1, further comprising:

a conversion unit that aligns height of an end of each of said lead-out lines, which are wired as being overlapped with each other, in a normal direction of said display region, the ends being connected to said display region, wherein said conversion unit on each of said lead-out lines has a same resistance value.

* * * * *